2,974,124
CONDENSATE OF BIUREA WITH CARBOXYLIC ACIDS

Cornelius Sherman Grove, Jr., East Syracuse, and Gerald F. Grillot and Vivian T. Stannett, Syracuse, N.Y., assignors to W. R. Grace & Co., New York, N.Y., a corporation of Connecticut No Drawing. Filed Feb. 20, 1958, Ser. No. 716,280

7 Claims. (Cl. 260—77.5)

This invention relates to a new method of preparing a resin. More specifically it pertains to a method of preparing a resin from biurea and a linear aliphatic dicarboxylic acid having a chain length of at least 3. Additionally that invention includes novel biurea-dicarboxylic acid reaction products in a resinous form.

In essence the invention embodies heating together biurea ($H_2NCONHNHCONH_2$) and a linear aliphatic dicarboxylic acid having a chain length of at least 3 at atmospheric pressure and thereby forming a resin which on cooling results in a clear hard vitreous product.

The prior art teaches that polycondensation products can be obtained by reacting under pressure biurea and its derivatives with dicarboxylic acids having a chain length of at least 6; see German Patent 745,473 to Moldenhauer et al. issued March 13, 1944. The product obtained is said to be suited for production of fibers and films.

In evaluating Moldenhauer's work, we have found that the anhydrides used by Moldenhauer at superatmospheric pressure are not operative at atmospheric pressure to form resins with biurea. It is therefore surprising that the reaction of biurea and a linear aliphatic dicarboxylic acid having a chain length of at least 3 will yield a clear resinous product at atmospheric pressure.

The biurea:dicarboxylic acid mole ratio can be in the range of 1 to 10:1 to 10.

The addition of a minor amount of an acid catalyst, such as p-toluene sulfonic acid, reduces the reaction time considerably but has no noticeable effect on the resinous product.

The following general procedure was used to make the novel resins. One mole of biurea and one mole of a dicarboxylic acid were intimately mixed together with an acid catalyst such as p-toluene sulfonic acid to the extent of 0.1% by weight of reactants employed and quickly heated by means of an oil bath to a temperature in the range of 200–250° C. The acid catalyst is not necessary, but accelerates the reaction. The reactions were performed in heat-resistant glass tubes (e.g., Pyrex tubes) at atmospheric pressure. After attaining a temperature in the range of 200–250° C. some product begins to form within seconds, and the reaction is generally complete in 30–40 minutes. However, longer reaction times, e.g., several hours, may be used if desired, but offer little or no advantage. A vigorous foaming usually erupts subsiding after approximately 30 minutes resulting in a clear solution. Upon partial cooling of the aforementioned clear solution, long filaments could be drawn therefrom by means of a glass rod. The resin on complete cooling was a clear hard vitreous product. Table I shows the exact mole ratios, weights, conditions and results of the various reactions.

TABLE I.—REACTIONS OF BIUREA WITH DICARBOXYLIC ACIDS

Biurea: Wt. used=0.354 gm.
Mole ratio, biurea:acid=1

[0.1% p-toluene sulfonic acid used as catalyst, based on weight of reactants]

| Acid | Weight, gm. | Remarks |
|---|---|---|
| Malonic | 0.312 | Sl. yellow liquid formed in 30 min. at 220–240° C. A clear slightly reddish-yellow resinous product formed on cooling. |
| Succinic | 0.354 | Dark amber liquid formed in about 10 min. at 230° C. Clear dark amber resinous product resulted. |
| Glutaric | 0.396 | Clear solution formed in 15 min. at 230° C. Clear almost colorless solid formed on cooling. |
| Adipic | 0.438 | Clear amber liquid in 28 min. at 220–230° C. Clear light to medium amber resinous product resulted. |
| Pimelic | 0.480 | Clear pale gold colored solution formed in 30 min. at 230° C. Clear yellow-red solid formed upon cooling. |
| Azelaic | 0.564 | Clear solution formed in 30 min. at 230° C. Clear resin-like solid formed upon cooling. |
| Sebacic | 0.606 | Dark amber liquid in 30 min. at 220–240° C. Clear dark amber resinous product resulted. |

The resin product was thereafter subjected to the following procedure to obtain solubility data. A 0.05 gram sample was weighed on an analytical balance and placed in a 10 x 75 mm. test tube to which 1.5 ml. of a solvent were added. The tube was manually shaken several times and the solubility of the resinous material in cold solvent was then recorded as soluble, slightly soluble or insoluble. The tube was thereafter placed in an oil bath which was gradually heated to the boiling point of the solvent and visible solubility was again recorded. A third observation as to solubility was made after the tube was removed from the oil bath and cooled back down to room temperature. Table II shows the results of the solubility tests of the novel resins in various solvents under the conditions specified supra.

TABLE II.—SOLUBILITIES OF PRODUCTS FORMED FROM THE REACTION OF BIUREA WITH THE FOLLOWING DICARBOXYLIC ACIDS

[Samples consist of 0.05 gm. of product per 1.5 cc. solvent]

| Solvent | Malonic | Succinic | Glutaric | Adipic | Pimelic | Azelaic | Sebacic |
|---|---|---|---|---|---|---|---|
| Toluene: | | | | | | | |
| Room Temp. | insol. | insol. | insol. | insol. | insol. | insol. | insol. |
| B. Pt. | insol. | insol. | insol. | insol. | insol. | insol. | insol. |
| After Cooling | insol. | insol. | insol. | insol. | insol. | insol. | insol. |
| Butyl Alcohol: | | | | | | | |
| Room Temp. | insol. | insol. | insol. | insol. | insol. | insol. | insol. |
| B. Pt. | insol. | insol. | insol. | insol. | insol. | suspension forms. | sol. A few particles in suspension. |

TABLE II.—Continued

| Solvent | Malonic | Succinic | Glutaric | Adipic | Pimelic | Azelaic | Sebacic |
|---|---|---|---|---|---|---|---|
| After Cooling | insol | insol | insol | insol | insol | insol | insol. |
| Methyl Ethyl: | | | | | | | |
| Room Temp | insol | insol | insol | insol | insol | insol | insol. |
| B. Pt | insol | insol | insol | insol | insol | insol | insol. |
| After Cooling | insol | insol | insol | insol | insol | insol | insol. |
| Dioxane: | | | | | | | |
| Room Temp | insol. color change. | insol | insol | insol | insol | insol | insol. |
| B. Pt | insol | insol | insol | insol | insol | insol | insol. |
| After Cooling | insol | insol | insol | insol | insol | insol | insol. |
| Chloroform: | | | | | | | |
| Room Temp | insol | insol | insol | insol | insol | insol | insol. |
| B. Pt | insol | insol | insol | insol | insol | insol | insol. |
| After Cooling | insol | insol | insol | insol | insol | insol | insol. |
| Dimethylformamide: | | | | | | | |
| Room Temp | suspension forms. | sol | sol | insol., very cloudy. | sol | insol | insol. |
| B. Pt | suspension forms. | sol | sol | sol | sol | sol | sol. |
| After Cooling | suspension forms. | sol | sol | insol | sol | insol | insol. |
| $H_2O$: | | | | | | | |
| Room Temp | sl. sol | sol | sol | sol., sl. cloudy. | sol., very cloudy. | insol | insol. |
| B. Pt | sol | sol | sol | sol | sol | insol | insol. |
| After Cooling | sl. sol | sol | sol | sol | sol | insol | insol. |
| Methyl Alcohol: | | | | | | | |
| Room Temp | insol | sol | sol | insol | sol | insol | insol. |
| B. Pt | insol | sol | sol | insol | sol | insol | insol. |
| After Cooling | insol | sol | sol | insol | sol | insol | insol. |

Softening point temperature ranges as shown in Table III were determined by the following general procedure. Solid resinous product was placed in a heat-resistant test tube (e.g., Pyrex tube) and heated slowly in an oil bath. The softening point range was designated as the temperature range between the first sign of softening and the temperature range at which the whole mass became entirely soft and sticky. More detailed procedures with respect to specific resins are given in Examples 3 and 4.

TABLE III.—SOFTENING POINT OF RESINS FORMED FROM THE REACTION OF BIUREA AND DICARBOXYLIC ACIDS

| Acid reacted with biurea | Softening Point Range, ° C. | |
|---|---|---|
| | Resin formation carried out at 220-230° C. and 1 atm. | 4 hrs. additional reaction time at 180±10° C. and 5-6 mm. Hg |
| Malonic | 110-120 | no data. |
| Succinic | 70-80 | no data. |
| Glutaric | 110-120 | no data. |
| Adipic | 70-80 | 80-90. |
| Pimelic | 80-90 | no data. |
| Azelaic | 110-120 | no data. |
| Sebacic | 80-90 | 80-90. |

In addition, a study was made to ascertain the effect of extended reaction time on the softening point of two of the resinous products; namely, the products formed from reacting biurea with adipic and sebacic acid. The results show that the softening points of these two resins did not change appreciably indicating no increase in chain length resulting from this extending reaction period. These reactions were initially carried out in a heat-resistant test tube (e.g., Pyrex tube) at a temperature of about 230° C. and atmospheric pressure until a clear resinous product was formed. Thereafter, the tube was maintained at a lower temperature in the range of 170–190° C. under 5-6 mm. vacuum for an additional four hours. Softening points of these products were determined using the procedure described supra.

The following examples will more fully describe the invention but should in no way limit it.

EXAMPLE 1

*Preparation of a biurea-malonic acid resinous product*

Biurea (0.354 gram) and malonic acid (0.312 gram) were admixed with 0.0006 gram of toluene sulfonic acid (catalyst) in a Pyrex test tube and forthwith heated to a temperature in the range of about 220 to 240° C. at atmospheric pressure by means of an oil bath. Upon attaining the aforementioned temperature range a vigorous foaming reaction occurred subsiding after about 30 minutes and resulting in a slightly yellow liquid. A clear slightly reddish-yellow resinous product formed on cooling.

EXAMPLE 2

*Preparation of a biurea-azelaic acid resinous product*

Biurea (0.354 gram) and azelaic acid (0.564 gram) were quickly heated along with 0.0009 gram of toluene sulfonic acid as a catalyst to a temperature of 230° C. After approximately 30 minutes a clear solution formed which on cooling formed a clear resin-like solid.

EXAMPLE 3

*Determination of softening point of resinous biurea-malonic acid product*

A quantity of the novel resinous product from Example 1 derived from biurea and malonic acid was placed in a Pyrex test tube and slowly heated by means of an oil bath. At a temperature of 110° C. the resinous product commenced softening and on further heating to 120° C. the entire product became a soft, sticky mass. The temperature range between which the product started softening and became completely soft, i.e., 110–120° C., was designated to be the softening point range for the whole resinous biurea-malonic acid product.

EXAMPLE 4

*Solubility of resinous biurea-malonic acid product*

Eight 0.05 gram samples of the resinous biurea-malonic acid product were weighed out and deposited in separate Pyrex test tubes. To each test tube was added 1.5 ml. of one of the following solvents: dioxane, chloroform, dimethylformamide, toluene, butyl alcohol, methyl ethyl ketone, water and methyl alcohol. Each tube at room temperature was manually shaken several times and the solubility of the resinous product was recorded as soluble, slightly soluble, or insoluble. Subsequent thereto the test tubes were placed in oil baths and each tube was gradually heated to the boiling point of the respective solvent contained therein at which temperature the solubility of the biurea-malonic acid resinous product in the boiling solvent was recorded. A third recordation of solubility of the resinous product in each aforementioned solvent was made when the solvents were cooled back down to room temperature. As can be seen in Table III the resinous biurea-malonic acid product was insoluble in all the aforesaid solvents excepting water, in which the resinous product is soluble at 100° C., and slightly soluble at room temperature in dimethylformamide, wherein a suspension forms at the temperatures tested.

EXAMPLE 5

*Casting a saucer*

To a weighed quantity of biurea and malonic acid admixed in a mole ratio of 1:1 in a Pyrex test tube, was added 0.1% by weight of reactants of p-toluene sulfonic acid as a catalyst. The reaction mass was quickly heated to a temperature of about 220 to 240° C. at atmospheric pressure by means of an oil bath. After approximately 30 minutes a clear solution formed. In this condition it is poured into a saucer-shaped landed positive type mold. After it is cooled to room temperature, the mold is opened and a saucer composed of the resin is obtained. The resin can be used in the molding industry and also as a surface coating for ornamental objects. Other uses for which the novel resin is applicable are trays, bottle closures, and the like.

We claim:
1. The process of forming a resin that comprises condensing biurea with an equimolar amount of a linear saturated dicarboxylic acid having a chain length of 3–9 carbon atoms at atmospheric pressure and at a temperature in the range of about 200° to 250° C.
2. The process according to claim 1 in which toluene sulfonic acid is used as a catalyst.
3. The process according to claim 1 in which the dicarboxylic acid is malonic acid.
4. The process according to claim 1 in which the dicarboxylic acid is glutaric acid.
5. The process according to claim 1 in which the dicarboxylic acid is pimelic acid.
6. The process according to claim 1 in which the dicarboxylic acid is azelaic acid.
7. The process according to claim 1 in which the dicarboxylic acid is sebacic acid.

References Cited in the file of this patent
UNITED STATES PATENTS

| | | |
|---|---|---|
| 2,349,979 | Moldenhauer et al. | May 30, 1944 |
| 2,378,571 | Moldenhauer et al. | June 19, 1945 |